Patented July 7, 1931

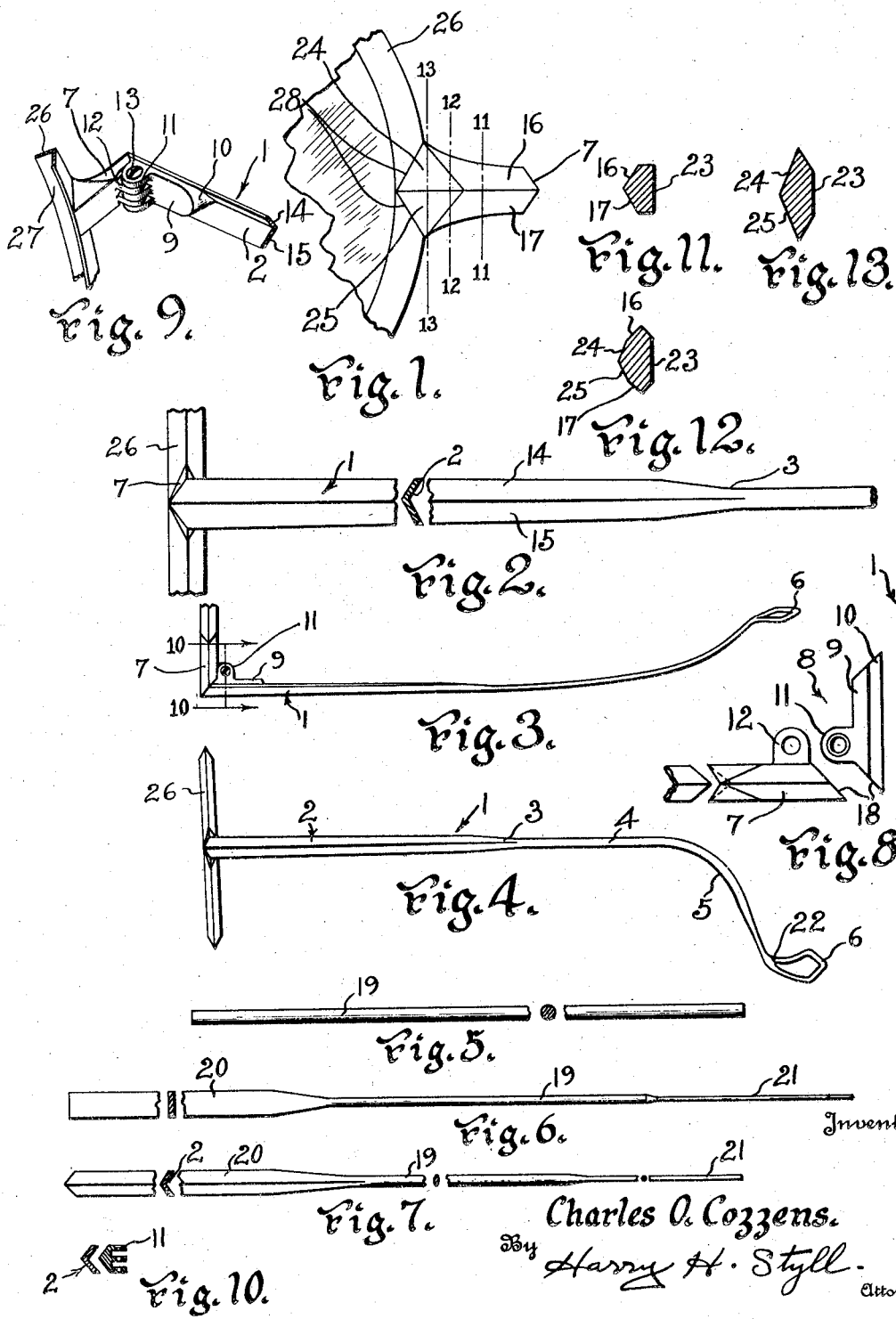

1,813,148

UNITED STATES PATENT OFFICE

CHARLES O. COZZENS, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS

OPHTHALMIC MOUNTING

Application filed February 8, 1928. Serial No. 252,780.

This invention relates to improvements in ophthalmic mountings and has particular reference to an improved temple and endpiece therefor and the process of making the same.

The principal object of the invention is to provide a temple that is relatively wide but will be thin and light and have unusual rigidity in cross section, together with an improved process for producing such a temple.

Another object of the invention is to provide improved means for hinging or securing such a temple to an ophthalmic mounting.

Another object of the invention is to provide improved means for securing the hinge or attaching member to the temple body.

Another object of the invention is to provide an improved temple, light in weight, strong in cross section, and having comfortable means for holding the temple in place behind the ears.

Another object of the invention is to provide an improved ear hook or end for a temple that is particularly adaptable to be pushed through the hair and will hold well and comfortably behind the ears.

Another object of the invention is to provide an improved endpiece for use with such a temple which will blend with the lines of a temple and provide stopping means to the temple at the right place when it is in use on the wearer.

Another object of the invention is to provide a temple of relatively large dimensions which may be made of a minimum of material and yet will be rigid in the directions in which greatest use will come.

Another object of the invention is to provide a temple of this character having a relatively rigid portion adjacent its attachment to the mounting and a relatively flexible portion adjacent the ear loop.

Other objects and advantages of the invention will become apparent from the following description taken in connection with the accompanying drawings and it will be apparent that many changes in the arrangement of parts and details of construction and the steps of the process may be made without departing from the spirit of the invention as expressed in the accompanying claims. I, therefore, do not wish to be limited to the exact details and arrangements shown, the preferred forms only having been shown by way of illustration.

Referring to the drawings:

Fig. 1 is a fragmentary elevation of an ophthalmic mounting showing a face view of the endpiece member as attached to the lens rim;

Fig. 2 is a fragmentary side elevation of an ophthalmic mounting showing the temple attached to the lens rim;

Fig. 3 is a top or plan view of the temple and endpiece embodying the invention;

Fig. 4 is a side elevation of Fig. 3;

Fig. 5 shows a step in the process of manufacture of the temple;

Fig. 6 shows another step in the process of manufacture;

Fig. 7 shows another step in the process of manufacture;

Fig. 8 is a fragmentary plan view illustrating the construction of the temple and endpiece member;

Fig. 9 is a fragmentary perspective view of the temple construction shown in Fig. 8;

Fig. 10 is a section on line 10—10 of Fig. 3;

Fig. 11 is a section on line 11—11 of Fig. 1;

Fig. 12 is a section on line 12—12 of Fig. 1;

Fig. 13 is a section on line 13—13 of Fig. 1.

For sometime past, and even at the present time, there has been and is a vogue for exceedingly large size frames for ophthalmic mountings. These are known as the shell type frame and are usually made of a cellulose composition material. The chief characteristic of such a mounting is its large size as compared with the usual metallic mountings of the prior art. Composition frames of this character have certain defects that are well recognized, chief among which is the tendency of the material to change its shape under the influence of temperature changes. The lenses are liable to creep or turn in the lens rims, and it is practically impossible to fit such a frame to the facial requirements of the wearer.

It is, therefore, one of the objects of the present invention to provide a metallic temple and endpiece connection corresponding in size to the usual composition parts but maintained at a minimum in weight so that the temple may be light and adjustable. At the same time its rigidity has been maintained in the butt section adjacent the connection to the ophthalmic frame and the desirable flexibility of metallic temples in the neighborhood of the ear loop obtained in the structure, which was practically impossible of attainment in the composition frames.

Referring to the drawings wherein similar reference characters denote corresponding parts throughout, the temple 1 comprises a thin butt section 2 which is dished in or hollowed out into a reentrant angle cross section which is shown best in Figs. 9 and 10. This reentrant angle cross section terminates at 3 in Fig. 4 where the cross section becomes rounded or elliptical in cross section as indicated at 4 in Fig. 4, terminating in the ear loop 5 and the terminal bearing button 6, which button is in the form of an open frame.

It will be seen that the butt section 2 is very rigid as to horizontal and vertical displacement due to its reentrant cross section and that the section 4 is flexible owing to its elliptical cross section, while the terminal button 6 provides a wide bearing surface against the skull behind the ear and also provides means by which the temple may be pushed through the hair when the frame is applied to feminine use.

The temple 1 is secured to the endpiece 7 by the hinge 8. The hinge 8 comprises a block 9, Fig. 9, having a reentrant under side which fits into the reentrant portion 2 of the butt of the temple 1. The end of the portion 9 opposite the temple connection is bevelled off or pointed at 10 so that it will fit into the reentrant angle of the butt 2, the sides of the portion 10 conforming with the sides of the reentrant angle in the butt 2. On the opposite end of the member 9 are the hinge ears 11. The member 9 is preferably soldered in the reentrant portion 2 of the temple, the bevelled off end 10 forming a neat joint which blends with the temple structure. The endpiece 7 also has hinge ears 12 which intermesh with the hinge ears 11 of the portion 9. The temple 1 is secured to the endpiece 7 by intermeshing the ears 11 and 12 and putting the screw 13 therethrough in the usual way.

The hinge ears 12 on the endpiece 7 may be integral therewith or may be put on a separate pad and soldered or otherwise secured thereto as desired.

It will be noted that the reentrant angle of the butt portion 2 of the temple 1 has the reentrant angle on the side of the temple which goes next to the head. This forms a bevel on the outside of the temple having the facets 14 and 15, Fig. 9 and Fig. 2. The endpiece 7 is also bevelled to have the facets 16 and 17, Fig. 1, which blend with the facets 14 and 15 of the temple 1 so that the central line of the temple and of the endpiece form one continuous line. The hinge end of the temple and the endpiece are bevelled as indicated at 18 in Fig. 8 to provide a stop so that the movement of the temple about the hinge will be limited to ninety degrees when the temple is extended from the frame.

By reference to Fig. 1 it will be seen that the cross section of the endpiece 7 is variable. Fig. 11 shows the cross section on line 11—11 of Fig. 1 having a flat surface 23 on the face side and the facets 16 and 17 on the outside. On line 12—12, Fig. 1 the cross section is as shown in Fig. 12 having a flat side 23 on the inside and the facets 16 and 17 on the outside and additional facets 24 and 25 while Fig. 13 shows a cross section on line 13—13 of Fig. 1 containing a flat portion 23 on the inside and the facets 24 and 25 on the outside.

It will be seen from Fig. 9 that the lens rim 26 has a V-shaped groove 27 on the inside for the lens, the rim being also of V-shape on the outside, and that in joining the endpiece 7 to the rim 26 the end of the endpiece which adjoins the frame is bevelled along the line 28 to form a structure which will blend in the facets of the endpiece with the rim.

In producing the temple I proceed as follows: I take a bar of material 19 as shown in Fig. 5 and swage or flatten out the butt portion 20, as shown in Fig. 5, leaving the rounded portion 19 and reducing the ear loop end as at 21. I next swage or press in the reentrant angle 2 in the section 20 as shown in Fig. 7, blending this portion in with the section 19 and reducing the section 19 to an elliptical cross section as shown in the cross section in Fig. 7. I next bend up the end of the portion 21 to form the tip pad 6 soldering in the end at 22, Fig. 4. Thereafter I bend the end 21 to form the ear loop 5, Fig. 4. Then the block 9 having been fashioned with its pointed end 10 and provided with the hinge ears 11 is placed in the reentrant angle 2 at the end thereof and soldered in place as indicated in Fig. 9. The endpiece of the mounting has previously been fashioned with the hinge ears 12. The ends of the endpiece 7 and the temple 1 are bevelled off as at 18, Fig. 8; the ears 11 and 12 are placed in intermeshing relation, and the pivot screw 13 is inserted therethrough as indicated in Fig. 9.

From the foregoing description the construction and operation and the process will be apparent, and it will be seen that I have provided in a unitary construction, simple, efficient and economical ways of producing a temple, producing a light weight temple of relatively large dimensions having a rigid butt section, a flexible section adjacent the ear portion with broad bearing surfaces at the end of the ear loop which may be easily entered through the hair when intended for feminine use, producing a structure well adapted to carry out all the advantages set forth, as well as others.

Having described my invention, I claim:

1. A temple connection for an ophthalmic mounting comprising a temple member having a substantially V-shaped dished cross section, a hinge member having a V-shaped body portion to fit into the recess of the V-shaped dished temple cross section and a bevelled end portion opposite the hinge connection end to taper off the joint with the temple, and having a projecting hinge connection for pivotally supporting a temple.

2. A temple connection for an ophthalmic mounting comprising a temple member having a concavo-convex cross section, a hinge member having a body portion to fit into the recess of the concavo-convex cross section of the temple and its end farthest removed from the hinge connection bevelled to taper off the joint with the temple, and having a projecting hinge connection for pivotally supporting a temple.

3. A temple connection for an ophthalmic mounting comprising a temple member having a dished V-shaped cross section, the apex of the V being on the outer side thereof and forming a straight longitudinal line centrally of the temple, a lens rim member having an endpiece for the temple connection having a V-shaped cross section, the apex line of the V aligning with the apex line of the V of the temple and forming a continuation thereof, and interengaging hinge members on the temple and endpiece hingedly connecting the two.

4. A temple connection for an ophthalmic mounting comprising a temple member having a dished V-shaped cross section, the apex of the V being on the outer side of the temple and forming a straight longitudinal line centrally of the temple, a lens rim member having an endpiece for the temple connection having a V-shaped cross section, the apex line of the V aligning with the apex line of the V of the temple and forming a continuation thereof, and V-shaped facets between the V-shaped cross section of the endpiece and the rim, the apex line of which forms a continuation of the apex line of the temple and endpiece, and interengaging hinge members on the temple and endpiece hingedly connecting the two.

CHARLES O. COZZENS.